(12) United States Patent
Ren et al.

(10) Patent No.: US 12,273,928 B2
(45) Date of Patent: Apr. 8, 2025

(54) METHOD AND DEVICE FOR RANDOM ACCESS

(71) Applicant: DATANG MOBILE COMMUNICATIONS EQUIPMENT CO., LTD., Beijing (CN)

(72) Inventors: Bin Ren, Beijing (CN); Deshan Miao, Beijing (CN); Shaohui Sun, Beijing (CN); Shaoli Kang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 565 days.

(21) Appl. No.: 17/430,538

(22) PCT Filed: Dec. 19, 2019

(86) PCT No.: PCT/CN2019/126707
§ 371 (c)(1),
(2) Date: Aug. 12, 2021

(87) PCT Pub. No.: WO2020/164309
PCT Pub. Date: Aug. 20, 2020

(65) Prior Publication Data
US 2022/0132593 A1   Apr. 28, 2022

(30) Foreign Application Priority Data

Feb. 14, 2019 (CN) .......................... 201910115043.7

(51) Int. Cl.
*H04W 74/0833* (2024.01)
*H04W 56/00* (2009.01)
(Continued)

(52) U.S. Cl.
CPC ..... *H04W 74/0841* (2013.01); *H04W 56/001* (2013.01); *H04W 56/0045* (2013.01);
(Continued)

(58) Field of Classification Search
CPC ......... H04W 74/0841; H04W 74/0866; H04W 56/001; H04W 56/0045; H04W 56/006;
(Continued)

(56) References Cited

U.S. PATENT DOCUMENTS

2019/0037608 A1    1/2019 Harada et al.
2021/0321464 A1 * 10/2021 Lin ....................... H04W 76/11

FOREIGN PATENT DOCUMENTS

CN        101908906 B  * 11/2012
CN        104349451 A    2/2015
(Continued)

OTHER PUBLICATIONS

Huawei et al., "Discussion on Timing Advance for NTN", 3GPP TSG RAN WG1 Meeting# 95, R1-1813673, Spokane, USA, Nov. 12-16, 2018. (Year: 2018).*

(Continued)

*Primary Examiner* — Saad A. Waqas
(74) *Attorney, Agent, or Firm* — Meunier Carlin & Curfman LLC

(57) ABSTRACT

Embodiments of the present application relates to a method and device for random access, for use in resolving the problem that no current random access process can satisfy requirements of a satellite communication system. The method of the embodiments of the present application comprises: receiving and obtaining a related parameter in a configuration message, the related parameter comprising common cell delay information; generating a physical random access channel random access preamble (PRACH Preamble) sequence, and determining an uplink sending timing location according to the common cell delay information; and sending the PRACH Preamble sequence on a time-frequency resource corresponding to the uplink sending timing location. A relative transmission delay and a (Continued)

multi-path channel delay from a terminal, to a satellite, and to a base station are compensated according to the determined uplink sending timing location, thereby reducing overheads of a PRACH channel.

18 Claims, 9 Drawing Sheets

(51) Int. Cl.
    *H04W 72/0446*   (2023.01)
    *H04W 72/0453*   (2023.01)
    *H04W 74/08*     (2009.01)
    *H04W 84/06*     (2009.01)
(52) U.S. Cl.
    CPC ..... *H04W 56/006* (2013.01); *H04W 72/0446* (2013.01); *H04W 72/0453* (2013.01); *H04W 74/0866* (2013.01); *H04W 84/06* (2013.01)
(58) Field of Classification Search
    CPC ......... H04W 72/0446; H04W 72/0453; H04W 84/06
    See application file for complete search history.

(56) References Cited

FOREIGN PATENT DOCUMENTS

| CN | 106506061 A | 3/2017 |
|---|---|---|
| CN | 107197517 A | 9/2017 |
| CN | 108605368 A | 9/2018 |
| CN | 109104226 A | 12/2018 |
| EP | 1209938 A1 | 5/2002 |
| JP | 2015032879 A | 2/2015 |
| WO | 2012106798 A1 | 8/2012 |
| WO | 2017164999 A1 | 9/2017 |
| WO | 2018226026 A1 | 12/2018 |

OTHER PUBLICATIONS

Ericsson, On Adapting HARQ Procedures for NTN, 3GPP TSG-RAN WGU Meeting #94bis Tdoc R1-1811330, Oct. 12, 2018, pp. 1-2.

Thales, IDC, NR-NTN: solution principles for NR to support non-terrestrial netowrks, 3GPP TSG RAN1 Meeting # 93 R1-1807864, May 25, 2018, pp. 1-12.

International Search Report issued in PCT/CN2019/126707, mailed Mar. 18, 2020, 4 pages.

3GPP TSG-RAN WG1 Meeting #95, Ericsson, "On adapting random access procedures for NTN," R1-1813367, Spokane, USA, Nov. 12-16, 2018.

3GPP TSG RAN WG1 Meeting #95, Huawei, HiSilicon, "Discussion on random access procedure for NTN," R1-1813661, Spokane, USA, Nov. 12-16, 2018.

3GPP TSG RAN WG1 Meeting #95, "Huawei, HiSilicon, Discussion on Timing Advance for NTN," R1-1813673, Spokane, USA, Nov. 12-16, 2018.

3GPP, "3rd Generation Partnership Project; Technical Specification Group Radio Access Network; Study on New Radio (NR) to support non terrestrial networks," Release 15, TR 38.811 (Jun. 2018).

\* cited by examiner

METHOD AND DEVICE FOR RANDOM ACCESS

CROSS-REFERENCE OF RELATED APPLICATIONS

The application is a national phase entry under 35 U.S.C. § 371 of International Application No. PCT/CN2019/126707, filed on Dec. 19, 2019, which claims the priority from Chinese Patent Application No. 201910115043.7, filed with the Chinese Patent Office on Feb. 14, 2019 and entitled "Method and Device for Random Access", which are hereby incorporated by reference in their entireties.

TECHNICAL FIELD

The application relates to the technical field of Non-Terrestrial Networks (NTN), and in particular to a method and device for random access.

BACKGROUND

The Non-Terrestrial Networks (NTN) includes a satellite communication system with a cell radius much larger than that of a conventional cellular communication system and introduces a large propagation delay. For a particular downlink beam of a cell covered by a satellite communication system, there are two types of random access synchronization delay as follows.

One is the public transmission delay. As shown in FIG. 1, the terminal 1 receives the GPS (Global Positioning System) signal from the satellite 3 and performs the accurate positioning. According to the satellite's signal in the same beam, it is twice the sum of the minimum link delay T1 of the position (where terminal 1 is located in) closest to the satellite and the feed link delay T2, that is, the public transmission delay is 2(T1+T2), where the feed link delay T2 is the feed link delay from the satellite to the gateway station 2.

The other is the relative transmission delay. As shown in FIG. 2, in the same beam, the delay T3 corresponding to the propagation distance difference d3 between the user link propagation path of the terminal and the path of the minimum link delay of the position closest to the satellite 1 is the relative transmission delay.

The Physical layer Random Access CHannel (PRACH Preamble) is mainly used for the uplink synchronization process of initial access, so the time domain structure of Cyclic Prefix (CP)+PRACH Preamble sequence+Guard Time (GT) is adopted as the design basis, where CP is used to counteract the relative round-trip transmission delay 2×T3 among terminal-satellite-base station and multipath transmission delay and avoid the interference of other uplink signals to the PRACH Preamble sequence, and the GT is used to counteract the relative round-trip transmission delay 2×T3 among terminal-satellite-base station and avoid the interference of the PRACH Preamble sequence to other uplink signals, which will increase the CP overhead of the PRACH channel and cause the transmission efficiency of the NTN system to decrease.

If the NTN system adopts the closed-loop random access based on the NR (New Radio) system, the terminal obtains the values of the minimum link delay T1 and the feed link delay T2 of the position closest to the satellite in the beam area where the terminal is located according to the system message, calculates the time window of the corresponding Random Access Response (RAR), and sends the PRACH Preamble on the appropriate PRACH channel. Since the terminal cannot obtain the accurate position information through the GPS signal and thus cannot obtain the propagation distance difference (d3 as shown in FIG. 2) between the user link propagation path of the terminal and the path of the minimum link delay of the position closest to the satellite, that is, cannot obtain the relative transmission delay T3, the CP length included in the PRACH Preamble format is greater than the relative transmission delay 2×T3.

To sum up, the closed-loop random access process based on the current NR and the PRACH Preamble format of the NR cannot meet the requirements of satellite communication systems. On the one hand, if the closed-loop random access process based on the NR is reused, the overhead of the PRACH channel will be increased, so that the transmission efficiency of the NTN system decreases; and on the other hand, if the relative transmission delay T3 is greater than the size of the CP of the PRACH Preamble, the PRACH Preamble format of the 5G NR cannot be reused, for example, the largest CP length supported by the long PRACH Preamble sequence supported by the 5G NR is 0.684 ms. For all cases where T3 is greater than 0.684 ms in the satellite system, a new PRACH Preamble format needs to be designed. Therefore, there is currently no good solution for the NTN system.

SUMMARY

The application provides a method and device for random access, so as to solve the problem that there is no random access process that can meet the requirements of a satellite communication system.

In a first aspect, an embodiment of the application provides a method for a terminal to perform random access, which includes:
- receiving and obtaining a related parameter in a configuration message, wherein the related parameter includes cell public delay information;
- generating a PRACH Preamble sequence, and determining an uplink transmission timing position according to the cell public delay information;
- sending the PRACH Preamble sequence on a time-frequency resource corresponding to the uplink transmission timing position.

As an optional embodiment, determining an uplink transmission timing position according to the cell public delay information, includes:
- determining a timing advance of the uplink transmission timing position relative to a configuration message receiving position according to the cell public delay information;
- determining the uplink transmission timing position according to the configuration message receiving position and the timing advance.

As an optional embodiment, determining a timing advance of the uplink transmission timing position relative to a configuration message receiving position according to the cell public delay information, includes:
- estimating a relative transmission delay corresponding to a propagation distance difference between a user link propagation path of the terminal and a path of a minimum link delay of a position closest to a satellite;
- determining a cell-level timing advance of a deviation between a cell public delay and an integer multiple of a slot according to the cell public delay information;
- determining the timing advance according to the relative transmission delay and the cell-level timing advance.

As an optional embodiment, the estimating a relative transmission delay, includes:
- determining positioning information of the terminal according to a Global Navigation Satellite System (GNSS) signal, and obtaining functioning parameter information of the satellite through ephemeris;
- estimating the propagation distance difference between the user link propagation path of the terminal and the path of the minimum link delay of the position closest to the satellite according to the positioning information and the functioning parameter information of the satellite;
- determining the relative transmission delay corresponding to the estimated propagation distance difference.

As an optional embodiment, determining the timing advance according to the relative transmission delay and the cell-level timing advance, includes:
- finding a sum of twice the relative transmission delay and the cell-level timing advance to obtain the timing advance.

As an optional embodiment, after sending the PRACH Preamble sequence on the time-frequency resource corresponding to the uplink transmission timing position, the method further includes:
- detecting a feedback RAR message within an RAR time window, wherein the RAR message includes an uplink timing advance adjustment and an uplink grant, and the RAR time window starts from the configuration message receiving position;
- achieving uplink synchronization according to the feedback RAR message, and sending a Radio Resource Control (RRC) message;
- receiving and decoding a feedback contention resolution message.

As an optional embodiment, the configuration message further includes a PRACH Preamble format.

As an optional embodiment, the PRACH Preamble format includes plurality of CPs, a Preamble sequence and GT, wherein a total duration of the plurality of CPs is greater than a sum of a transmission delay introduced by a movement distance of a satellite in a random access process of the terminal, a delay introduced by a GPS positioning error and a delay introduced by a timing estimation error in a downlink initial synchronization process;
- a total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the subcarrier interval occupied by the PRACH Preamble sequence is determined according to a Doppler frequency offset range corresponding to the terminal at different moving speeds and/or a sum of a residual frequency offset after the initial synchronization of the terminal and a Doppler frequency offset caused by satellite movement in a process of sending the configuration message.

As an optional embodiment, before sending the PRACH Preamble sequence on the time-frequency resource corresponding to the uplink transmission timing position, the method further includes:
- performing frequency offset pre-compensation on the generated PRACH Preamble sequence based on an estimated downlink frequency offset.

As an optional embodiment, performing frequency offset pre-compensation on the generated PRACH Preamble sequence based on an estimated downlink frequency offset, includes:
- performing, by the terminal, downlink cell search according to a periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal;
- estimating a downlink frequency offset $f_{delta}$ according to a periodic downlink synchronization signal and/or reference signal;
- performing the frequency offset pre-compensation on the generated PRACH Preamble sequence according to a formula of:

$$S'_{PRACH}(t)=S_{PRACH}(t)\times\exp(-j\times2\pi\times f_{delta});$$

wherein $S_{PRACH}(t)$ is a time-domain signal of the PRACH Preamble sequence.

In a second aspect, an embodiment of the application provides a method for a network-side device to perform random access, which includes:
- sending a configuration message carrying a related parameter to a terminal, wherein the related parameter includes cell public delay information;
- determining an uplink receiving timing position according to the cell public delay information;
- detecting a PRACH Preamble sequence sent by the terminal on all candidate PRACH time-frequency resources according to the uplink receiving timing position.

As an optional embodiment, determining an uplink receiving timing position according to the cell public delay information, includes:
- determining an offset of the uplink receiving timing position relative to a configuration message sending position according to the cell public delay information;
- determining the uplink receiving timing position according to the offset of the uplink receiving timing position relative to the configuration message sending position as well as the configuration message sending position.

As an optional embodiment, determining an offset of the uplink receiving timing position relative to a configuration message sending position according to the cell public delay information, includes:
- determining a cell-level timing advance of a deviation between a cell public delay and an integer multiple of a slot according to the cell public delay information;
- determining the offset of the uplink receiving timing position relative to the configuration message sending position according to the cell public delay information and the cell-level timing advance.

As an optional embodiment, determining the offset of the uplink receiving timing position relative to the configuration message sending position according to the cell public delay information and the cell-level timing advance, includes:
- subtracting the cell-level timing advance from the cell public delay to obtain the offset of the uplink receiving timing position relative to the configuration message sending position.

As an optional embodiment, the method further includes:
sending an RAR message to the terminal after detecting the PRACH Preamble sequence sent by the terminal, wherein the RAR message includes an uplink timing advance adjustment and an uplink grant;
receiving an RRC message sent by the terminal after achieving uplink synchronization;
sending a contention resolution message to the terminal.

As an optional embodiment, the configuration message further includes a PRACH Preamble format.

As an optional embodiment, the PRACH Preamble format includes plurality of CPs, a Preamble sequence and GT, wherein a duration of the plurality of CPs is greater than a sum of a transmission delay introduced by a movement distance of a satellite in a random access process of the terminal, a delay introduced by a GPS positioning error and a delay introduced by a timing estimation error in a downlink initial synchronization process;
a total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, determining the subcarrier interval occupied by the PRACH Preamble sequence according to the Doppler frequency offset range supported by the terminal, includes:
determining the subcarrier interval occupied by the PRACH Preamble sequence according to a Doppler frequency offset range corresponding to the terminal at different moving speeds and/or a sum of a residual frequency offset after the initial synchronization of the terminal and a Doppler frequency offset caused by satellite movement in a process of sending the configuration message.

In a third aspect, an embodiment of the application provides a terminal for random access, which includes: a processor and a memory, wherein the processor is configured to read a program in the memory and execute the following process:
receiving and obtaining a related parameter in a configuration message, wherein the related parameter includes cell public delay information;
generating a PRACH Preamble sequence, and determining an uplink transmission timing position according to the cell public delay information;
sending the PRACH Preamble sequence on a time-frequency resource corresponding to the uplink transmission timing position.

As an optional embodiment, the processor is specifically configured to:
determine a timing advance of the uplink transmission timing position relative to a configuration message receiving position according to the cell public delay information;
determine the uplink transmission timing position according to the configuration message receiving position and the timing advance.

As an optional embodiment, the processor is specifically configured to:
estimate a relative transmission delay corresponding to a propagation distance difference between a user link propagation path of the terminal and a path of a minimum link delay of a position closest to a satellite;
determine a cell-level timing advance of a deviation between a cell public delay and an integer multiple of a slot according to the cell public delay information;
determine the timing advance according to the relative transmission delay and the cell-level timing advance.

As an optional embodiment, the processor is specifically configured to:
determine positioning information of the terminal according to a GNSS signal, and obtain functioning parameter information of the satellite through ephemeris;
estimate the propagation distance difference between the user link propagation path of the terminal and the path of the minimum link delay of the position closest to the satellite according to the positioning information and the functioning parameter information of the satellite;
determine the relative transmission delay corresponding to the estimated propagation distance difference.

As an optional embodiment, the processor is specifically configured to:
find a sum of the relative transmission delay and the cell-level timing advance to obtain the timing advance.

As an optional embodiment, the processor is specifically further configured to:
detect a feedback RAR message within an RAR time window, wherein the RAR message includes an uplink timing advance adjustment and an uplink grant, and the RAR time window starts from the configuration message receiving position;
achieve uplink synchronization according to the feedback RAR message, and send an RRC message;
receive and decode a feedback contention resolution message.

As an optional embodiment, the configuration message further includes a PRACH Preamble format.

As an optional embodiment, the PRACH Preamble format includes plurality of CPs, a Preamble sequence and GT, wherein a duration of the plurality of CPs is greater than a sum of a transmission delay introduced by a movement distance of a satellite in a random access process of the terminal, a delay introduced by a GPS positioning error and a delay introduced by a timing estimation error in a downlink initial synchronization process;
a total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the subcarrier interval occupied by the PRACH Preamble sequence is determined according to a Doppler frequency offset range corresponding to the terminal at different moving speeds and/or a sum of a residual frequency offset after the initial synchronization of the terminal and a Doppler frequency offset caused by satellite movement in a process of sending the configuration message.

As an optional embodiment, the processor is specifically further configured to:
perform frequency offset pre-compensation on the generated PRACH Preamble sequence based on an estimated downlink frequency offset.

As an optional embodiment, the processor is specifically configured to:

perform downlink cell search according to a periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal;

estimate a downlink frequency offset $f_{delta}$ according to a periodic downlink synchronization signal and/or reference signal;

perform the frequency offset pre-compensation on the generated PRACH Preamble sequence according to a formula of:

$$S'_{PRACH}(t) = S_{PRACH}(t) \times \exp(-j \times 2\pi \times f_{delta});$$

wherein $S_{PRACH}(t)$ is a time-domain signal of the PRACH Preamble sequence.

In a fourth aspect, an embodiment of the application provides a network-side device for random access, which includes: a processor and a memory, wherein the processor is configured to read a program in the memory and execute the following process:

sending a configuration message carrying a related parameter to a terminal, wherein the related parameter includes cell public delay information;

determining an uplink receiving timing position according to the cell public delay information;

detecting a PRACH Preamble sequence sent by the terminal on all candidate PRACH time-frequency resources according to the uplink receiving timing position.

As an optional embodiment, the network-side device is specifically configured to:

determine an offset of the uplink receiving timing position relative to a configuration message sending position according to the cell public delay information;

determine the uplink receiving timing position according to the offset of the uplink receiving timing position relative to the configuration message sending position as well as the configuration message sending position.

As an optional embodiment, the network-side device is specifically configured to:

determine a cell-level timing advance of a deviation between a cell public delay and an integer multiple of a slot according to the cell public delay information;

determine the offset of the uplink receiving timing position relative to the configuration message sending position according to the cell public delay information and the cell-level timing advance.

As an optional embodiment, the network-side device is specifically configured to:

subtract the cell-level timing advance from the cell public delay to obtain the offset of the uplink receiving timing position relative to the configuration message sending position.

As an optional embodiment, the network-side device is specifically further configured to:

send an RAR message to the terminal after detecting the PRACH Preamble sequence sent by the terminal, wherein the RAR message includes an uplink timing advance adjustment and an uplink grant;

receive an RRC message sent by the terminal after achieving uplink synchronization;

send a contention resolution message to the terminal.

As an optional embodiment, the configuration message further includes a PRACH Preamble format.

As an optional embodiment, the PRACH Preamble format includes plurality of CPs, a Preamble sequence and GT, wherein a duration of the plurality of CPs is greater than a sum of a transmission delay introduced by a movement distance of a satellite in a random access process of the terminal, a delay introduced by a GPS positioning error and a delay introduced by a timing estimation error in a downlink initial synchronization process;

a total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the network-side device is specifically configured to:

determine the subcarrier interval occupied by the PRACH Preamble sequence according to a Doppler frequency offset range corresponding to the terminal at different moving speeds and/or a sum of a residual frequency offset after the initial synchronization of the terminal and a Doppler frequency offset caused by satellite movement in a process of sending the configuration message.

In a fifth aspect, an embodiment of the application provides a computer storage medium storing a computer program thereon, where the program, when executed by a processor, implements any solution in the first aspect described above.

In a sixth aspect, an embodiment of the application provides a computer storage medium storing a computer program thereon, where the program, when executed by a processor, implements any solution in the second aspect described above.

The embodiments of the application propose an open-loop-based random access process of the satellite communication system NTN. In the open-loop random access process, the terminal compensates for the relative transmission and public transmission delay among the terminal-satellite-base station according to the determined uplink transmission timing position, and can support the small CP length in the PRACH Preamble sequence and compensate for the relative transmission delay and public transmission delay in the form of sending the PRACH Preamble sequence in advance at the determined sending timing position, thereby reducing the overhead of the PRACH channel.

BRIEF DESCRIPTION OF THE DRAWINGS

In order to illustrate the technical solutions in the embodiments of the application more clearly, the accompanying figures which need to be used in describing the embodiments will be introduced below briefly. Obviously the accompanying figures described below are only some embodiments of the application, and other accompanying figures can also be obtained by those ordinary skilled in the art according to these accompanying figures without creative labor.

DETAILED DESCRIPTION OF THE EMBODIMENTS

In the following, some terms in the embodiments of the application are explained so as to facilitate the understanding of those skilled in the art.

In the embodiments of the application, "and/or" describes the association relationship of associated objects, indicating that there may be three relationships, for example, A and/or B may represent: only A, both A and B, and only B. The character "I" generally indicates that the associated objects have a kind of "or" relationship.

In the embodiments of the application, the terminal is a device with the wireless communication function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal may be: a mobile phone, a pad, a computer with wireless transceiver function, a Virtual Reality (VR) terminal, an Augmented Reality (AR) terminal, a wireless terminal in the industrial control, a wireless terminal in the self-driving, a wireless terminal in the remote medical, a wireless terminal in the smart grid, a wireless terminal in the transportation safety, a wireless terminal in the smart city, a wireless terminal in the smart home, etc.; or may be various forms of UE, Mobile Station (MS), terminal device.

The network-side device may be a gateway station, which is a device that provides the wireless communication function for the terminal, including but not limited to: base station, gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the application may also be a device that provides the wireless communication function for the terminal in other communication systems that may appear in the future.

In order to make the objects, technical solutions and advantages of the application clearer, the application will be further illustrated below in details with reference to the accompanying figures. Obviously the described embodiments are merely a part of the embodiments of the application but not all the embodiments. Based upon the embodiments of the application, all of other embodiments obtained by those ordinary skilled in the art without creative work pertain to the protection scope of the application.

Figure 3:
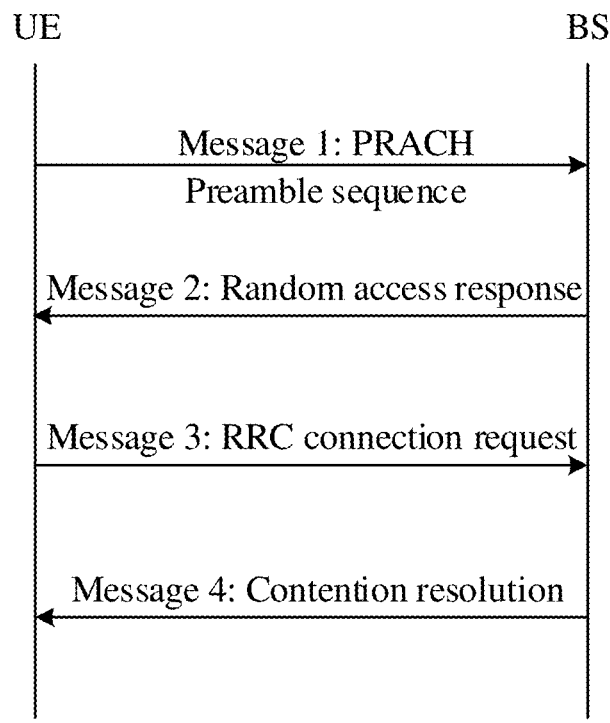
FIG. 3 shows a schematic diagram of a random access process in the 5G NR system provided by an embodiment of the application.

The random access process in the 5G NR system is shown in FIG. 3, which mainly includes the following process.

Step 0: a base station sends a configuration message 1, and a UE receives the configuration message 1 and obtains related parameters in the configuration message 1.

Before performing the random access process, the base station sends the above-mentioned related parameters to the UE through a System Information Block (SIB1) message, where the related parameters include the parameters of the SSB index set, PRACH time-frequency resources, PRACH Preamble format and PRACH Preamble sequence set.

The UE obtains the parameters of the SSB index set, PRACH time-frequency resources, PRACH Preamble format and PRACH Preamble sequence set through the SIB1 message.

Step 1: the UE sends a message 1 to the base station.

The UE generates a PRACH Preamble sequence according to the obtained related parameters of the configuration message 1, and sends the PRACH Preamble sequence on the selected PRACH time-frequency resource, where the PRACH time-frequency resource candidate set is notified by the SIB1 message, and the UE randomly selects one resource equiprobably from the PRACH time-frequency resource candidate set notified by the SIB1 message.

Step 2: the base station sends a message 2 to the UE, and the UE receives the message 2.

The base station detects the Preamble sequence on all candidate PRACH time-frequency resources. If the base station detects the Preamble sequence, it will feed back the corresponding RAR information on the PDCCH/PDSCH. The RAR information includes the uplink timing advance adjustment of the UE and the uplink grant for scheduling the transmission of a message 3 of the UE.

After sending the Preamble sequence, the UE detects the RAR message fed back by the downlink PDCCH/PDSCH channel within one RAR time window. If the corresponding RAR message is detected, it means that the random access preamble sequence sent by the UE is detected by the base station.

Step 3: the UE sends a message 3 to the base station.

The UE achieves uplink synchronization according to the uplink timing advance adjustment in the RAR message, and sends the message 3 (for example, bearing an RRC connection request message of the upper layer) on the PUSCH channel according to the uplink grant.

Step 4: The base station sends a message 4 to the UE.

After receiving and parsing the UE identity included in the message 3, the base station sends the message 4 on the PDSCH channel. The UE receives and decodes a contention resolution message included in the message 4 on the PDSCH channel, and completes the 4-step random access process after the contention resolution is successful.

In the random access process in the 5G NR system, the reference point of uplink timing for the UE to send the uplink PRACH is the downlink reception timing of the configuration message of the UE. It can be seen that the radio propagation delay between the downlink sending timing and the uplink reception timing of the base station is twice the cumulative sum of the maximum one-way transmission delay and the maximum multipath delay, so the CP length of the PRACH is required to be no less than the cumulative sum of the public transmission delay and the relative transmission delay. The uplink or downlink channel of the next slot of the slot where the PRACH is located includes the CP to counteract the relative transmission delay, so the GT length of the PRACH is required to be no less than the public transmission delay.

If the NTN adopts the NR-based closed-loop random access: the CP length included in the Preamble format is required to be greater than the relative transmission delay 2*T3, avoiding the interference of the PRACH preamble sequence to other uplink signals. This will increase the CP overhead of the PRACH channel and cause the transmission efficiency of the NTN system to decrease.

The application proposes a random access process applied to the NTN system. Unlike the existing closed-loop random access process of the 5G NR system, the application uses the open-loop random access process. Before performing the random access process, the terminal determines the uplink transmission timing position according to the cell public delay information in the received configuration message to adjust the uplink sending moment, which is equivalent to sending the PRACH Preamble sequence in advance. The advance sending moment is the determined uplink transmission timing position, which is determined according to the cell public delay information and can compensate for the relative transmission delays between terminals at different positions from the satellite and the terminal at the closest position to the satellite in a cell covered by the satellite beams, ensuring that the uplink transmission timing positions of all terminals in the cell are the same. Simultaneously, there is no need to counteract the public transmission delay among the terminal-satellite-base station through the GT in the RACH Preamble sequence sent in the uplink, and the total length of the CPs in the PRACH Preamble sequence that can be supported is small, reducing the overhead of the PRACH channel and improving the transmission efficiency of the NTN system.

Figure 4:
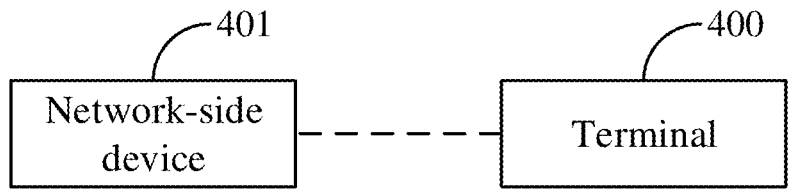
FIG. 4 shows a schematic diagram of a random access process system provided by an embodiment of the application.

As shown in FIG. 4, a system for random access in an embodiment of the application includes:

a terminal 400 configured to: receive and obtain a related parameter in a configuration message, where the related parameter includes the cell public delay information; generate a PRACH Preamble sequence, and determine an uplink transmission timing position according to the cell public delay information; and send the PRACH Preamble sequence on the time-frequency resource corresponding to the uplink transmission timing position;

a network-side device 401 configured to: send a configuration message carrying a related parameter to the terminal, where the related parameter includes the cell public delay information; determine an uplink receiving timing position according to the cell public delay information; and detect a PRACH Preamble sequence sent by the terminal on all candidate PRACH time-frequency resources according to the uplink receiving timing position.

Before performing the random access process, the network-side device can send a configuration message carrying related parameters to the terminal through a System Information Block (SIB1) message; and the terminal receives the configuration message through the SIB1 message and obtains the related parameters in the configuration message.

The above-mentioned related parameters include the parameters of the cell public delay information, Synchronization Signal Block (SSB) index set, PRACH time-frequency resources, PRACH Preamble format, and PRACH Preamble sequence set.

Here, the cell public delay information in the embodiment of the application is the random access synchronization delay that may exist when the NTN system covers a specific downlink beam area of a cell, and the cell public delay information is the public transmission delay of the beam area where the terminal is located obtained according to a system broadcast message, where the system broadcast message may be a broadcast message transmitted through a satellite or a broadcast message transmitted through the network-side device.

The method for the network-side device to determine the public delay information of the cell is as follows.

Figure 1:
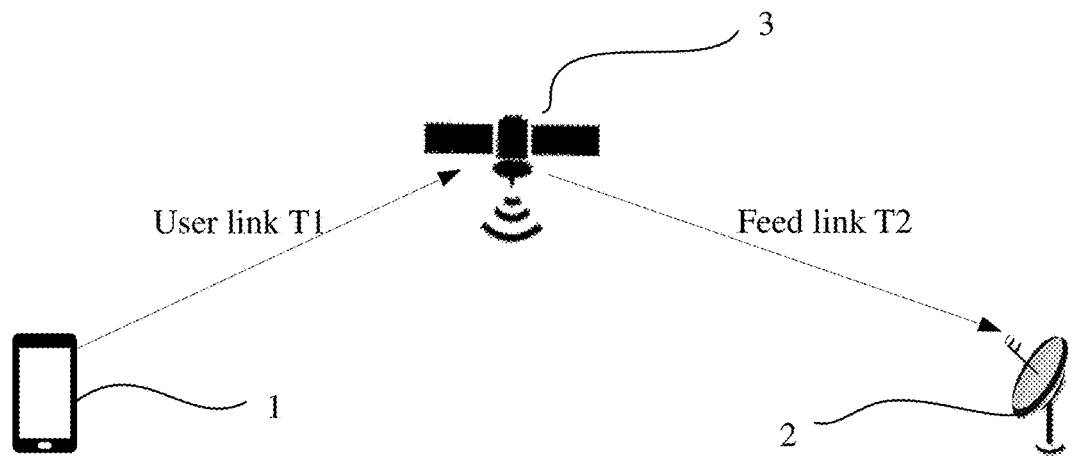
FIG. 1 shows a schematic diagram of a public transmission delay of a satellite communication system provided by an embodiment of the application.

The network-side device obtains the public delay of the broadcast cell according to the satellite's star in the same beam, the minimum link delay T1 generated by the communication of the terminal closest to the satellite with the satellite as well as the feed link delay T2 generated between the satellite and the network-side device, where the public delay of the broadcast cell is 2(T1+T2). The minimum link delay T1 corresponds to the user link T1 in FIG. 1, and the feed link delay T2 corresponds to the feed link T2 in FIG. 1. The network-side device in FIG. 1 is the gateway station 2, but the network-side device in FIG. 1 is only a specific embodiment. The network-side device in the embodiments of the application includes a gateway station or a base station, but is not limited to a gateway station or a base station.

Figure 2:
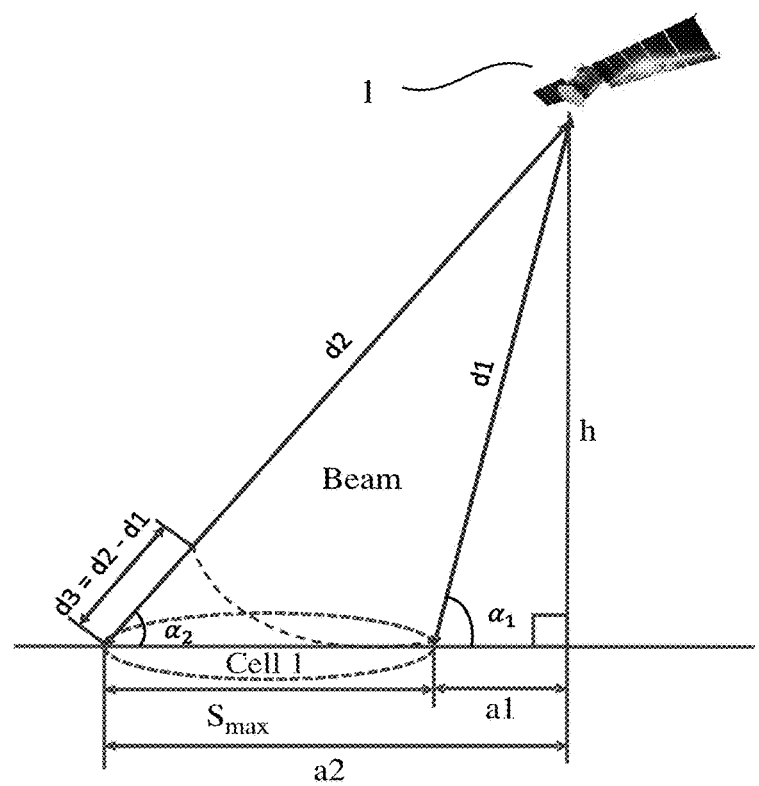
FIG. 2 shows a schematic diagram of a relative transmission delay of a satellite communication system provided by an embodiment of the application.

In an embodiment of the application, when the NTN system covers a specific downlink beam area of a cell, there are two types of random access synchronization delays, and the uplink transmission timing position is determined, wherein one type of random access synchronization delay is the public transmission delay that exists when the terminal determines that the NTN system covers a specific downlink beam area of a cell by receiving the cell public delay information; and the other type of random access synchronization delay is the delay corresponding to the propagation distance difference between the user link propagation path of the terminal and the path of the minimum link delay at the geographic location closest to the satellite in the same coverage cell, where the propagation distance difference corresponds to d3 in FIG. 2.

Specifically, the terminal determines the uplink transmission timing position according to the following two parts of information:

one part is the cell public delay information in the related parameters sent by the network-side device and received by the terminal;

the other part is the relative transmission delay estimated by the terminal based on its own positioning information and the operating parameters of the satellite.

Therefore, the terminal determines the timing advance of the uplink transmission timing position relative to the configuration message receiving position according to the cell public delay information and the relative transmission delay. In view of the fact that the uplink transmission timing position of the terminal is adjusted according to the public transmission delay and relative transmission delay that exist in the NTN system in the embodiment of the application, compared with the random access process in the NR system, there is no need to design the GP+CP length meeting the sum of the public transmission delay and the relative transmission delay, and there is only a need to advance the uplink sending time. Compared with the NR system, the CP length is smaller, the PRACH channel overhead is smaller, and the transmission efficiency of the NTN system is improved.

On the one hand, the terminal determines the cell-level timing advance of the deviation between the cell public delay and the integer multiple of slot according to the cell public delay information; and on the other hand, the terminal estimates the relative transmission delay corresponding to the propagation distance difference between the user link propagation path and the path of the minimum link delay of the position closest to the satellite according to its own positioning information. The terminal determines the timing advance according to the relative transmission delay and the cell-level timing advance.

Specifically, the terminal determines the timing advance in the following manner.

1) Estimate the relative transmission delay corresponding to the propagation distance difference between the user link propagation path of the terminal and the path of the minimum link delay of the position closest to the satellite.

In the embodiment of the application, the terminal determines the positioning information of the terminal according to the GNSS signal and obtains the functioning parameter information of the satellite through the ephemeris; estimates the propagation distance difference between the user link propagation path of the terminal and the path of the minimum link delay of the position closest to the satellite according to the positioning information and the functioning parameter information of the satellite; and determines the relative transmission delay corresponding to the estimated propagation distance difference.

2) Determine a cell-level timing advance $T_{offset}$ of a deviation between the cell public delay and an integer multiple of a slot according to the cell public delay information, where the formula is as follows:

$$T_{offset}=2(T1+T2)-\text{floor}(2(T1+T2)/T_{SF}) \times T_{SF}$$

wherein $2(T1+T2)$ represents the public delay information of the cell, $T_{SF}$ represents the time length of a slot, floor(.) represents the round-down operation, and the basic unit of $T_{offset}$ is Ts;

$$T_s=1/(\Delta f_{ref} \cdot N_{f,ref}), \Delta f_{ref}=15 \times 10^3 \text{ Hz}, N_{f,ref}=2048.$$

3) Determine the timing advance according to the relative transmission delay and the cell-level timing advance.

Specifically, twice the relative transmission delay is summed with the cell-level timing advance to obtain the timing advance, where the formula is as follows:

$$N_{TA}=2*T3+T_{offset};$$

wherein $N_{TA}$ is the timing advance, and T3 is the relative transmission delay.

The embodiment of the application uses the above method to determine the uplink transmission timing position of the PRACH Preamble sequence to be sent. At the same time, in an embodiment of the application, before the terminal sends the PRACH Preamble sequence on the time-frequency resource corresponding to the uplink transmission timing position, the method further includes:

performing the frequency offset pre-compensation on the generated PRACH Preamble sequence based on an estimated downlink frequency offset.

Specifically, the terminal performs the downlink cell search according to the periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal.

Considering that the movement direction of the terminal will last for a period of time, the downlink frequency offset $f_{delta}$ can be estimated according to the periodic downlink synchronization signal and/or reference signal.

The frequency offset pre-compensation is performed on the generated PRACH Preamble sequence according to the formula of:

$$S'_{PRACH}(t)=S_{PRACH}(t) \times \exp(-j \times 2\pi \times f_{delta});$$

wherein $S_{PRACH}(t)$ is a time-domain signal of the PRACH Preamble sequence.

In summary, the terminal sends the PRACH Preamble sequence on the time-frequency resource corresponding to the uplink timing position after adjusting the uplink sending moment of the PRACH Preamble sequence and performing the frequency offset pre-compensation on the PRACH Preamble sequence to be sent.

The terminal sends the PRACH Preamble sequence on the time-frequency resource corresponding to the uplink transmission timing position.

Specifically, the terminal obtains a time-frequency resource candidate set of the PRACH Preamble sequence according to the received SIB1 message, and the terminal randomly selects one time-frequency resource equiprobably from the time-frequency resource candidate set as the time-frequency resource corresponding to the uplink timing position, and sends the PRACH Preamble sequence to the network-side device on the corresponding time-frequency resource.

Before receiving the PRACH Preamble sequence sent in the uplink, the network-side device determines the uplink receiving timing position according to the cell public delay information, and detects the PRACH Preamble sequence sent by the terminal for all candidate PRACH time-frequency resources at the determined uplink receiving timing position.

Specifically, the step of determining the uplink receiving timing position according to the cell public delay information includes the following.

1) Determining an offset $B_{TA}$ of the uplink receiving timing position relative to the configuration message sending position according to the cell public delay information.

The cell-level timing advance $T_{offset}$ of a deviation between the cell public delay and an integer multiple of a slot is determined according to the cell public delay information, where the formula is as follows:

$$T_{offset}=2(T1+T2)-\text{floor}(2(T1+T2)/T_{SF}) \times T_{SF};$$

wherein $2(T1+T2)$ represents the public delay information of the cell, $T_{SF}$ represents the time length of a slot, floor(.) represents the round-down operation, and the basic unit of $T_{offset}$ is Ts;

$$T_s=1/(\Delta f_{ref} \cdot N_{f,ref}), \Delta f_{ref}=15 \times 10^3 \text{ Hz}, N_{f,ref}=2048.$$

The offset $B_{TA}$ of the uplink receiving timing position relative to the configuration message sending position is determined according to the cell public delay information and the cell-level timing advance.

Specifically, the cell-level timing advance $T_{offset}$ is subtracted from the cell public delay of the broadcast cell to obtain the offset $B_{TA}$ of the uplink receiving timing position relative to the configuration message sending position. The formula is as follows:

$$B_{TA}=2(T1+T2)-T_{offset}$$

2) Determining the uplink transmission timing position according to the configuration message sending position and the timing advance.

After determining the uplink receiving timing position, the network-side device detects the PRACH Preamble sequence sent by the terminal for all candidate PRACH time-frequency resources. Specifically, the process in which the network-side device detects the PRACH Preamble sequence sent by the terminal is a process of removing the CP from the PRACH Preamble sequence. In an embodiment of the application, the CP length in the PRACH Preamble sequence does not need to be used to counteract the public transmission delay, so the CP length in the embodiment of the application is different from the CP length determined according to the prior art. Therefore, the CP removal operation in the embodiment of the application is the CP removal operation based on the CP length in the Preamble format in this embodiment.

Figure 5:
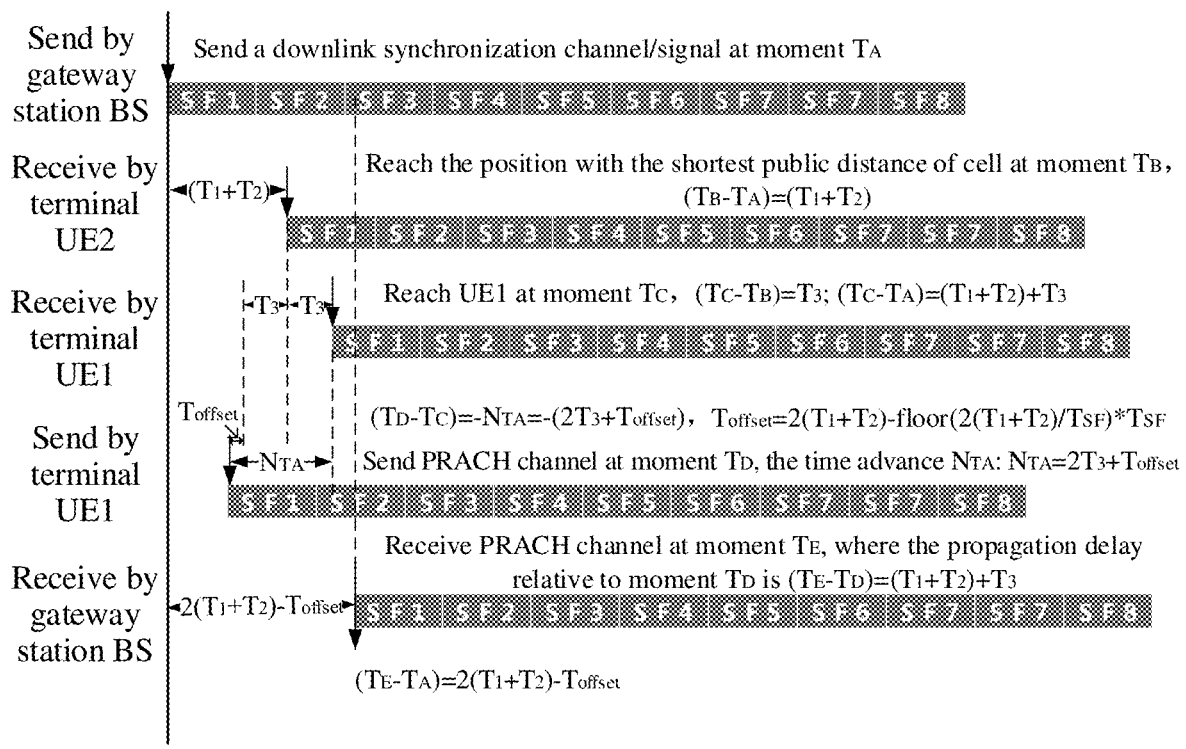
FIG. 5 shows a schematic diagram of the time sequence of a random access process provided by an embodiment of the application.

In an embodiment of the application, the time sequence relationship of sending and receiving of the terminal and the network-side device in the random access process based on the NTN system is as shown in FIG. 5. In the following, the specific functions of the cell public delay $2(T1+T2)$, the relative transmission delay T3 and the cell-level timing advance $T_{offset}$ will be described with reference to FIG. 5.

Firstly, the basic principle for establishing the timing advance of the terminal and network-side device of the NTN system is given as follows.

In the downlink of the terminal, the received downlink indexes, including the indexes of frame, subframe and slot, are used as the current subframe index; when the terminal achieves the uplink signal frame synchronization for the first time in the random access process, it is consistent with the public delay of the cell by supplementing the relative transmission delay, that is, the uplink transmission timing position of the shortest public distance of the cell from the satellite is used as the benchmark, and the time for signals from all terminals in the cell to reach the network-side device is based on the cell public distance. At this time, all terminals in a cell have the same uplink subframe index.

The random access system based on the NTN system in this embodiment includes: a gateway station BS, a terminal UE1 and a terminal UE2, wherein the terminal UE2 is the terminal with the shortest distance from the gateway BS in the cell, and the UE1 is any UE in the cell. The timing relationship between the UE and BS sides is as follows.

1) The gateway station sends a downlink synchronization channel/signal at the moment $T_A$, and sends the related parameters in the configuration message to the terminal.

Specifically, the downlink synchronization channel/signal may be the SIB1 message.

2) The terminal UE2 closest to the BS in the cell receives the configuration message at the moment $T_B$, where $(T_B-T_A)=(T1+T2)$, and the terminal UE1 receives the configuration message at the moment $T_C$, where $(T_C-T_A)=(T_1+T_2)+T_3$.

That is, the terminal UE2 is delayed by $T_1+T_2$ relative to the moment $T_A$ for the gateway station to send, where $T_1$ is the minimum link delay of the closest position to the satellite, and $T_2$ is the feed link delay. The terminal UE1 is delayed by $T_1+T_2+T_3$ relative to the moment $T_A$ for the gateway station to send.

3) The terminal UE1 sends the PRACH Preamble at the moment $T_D$, where the time advance relative to the moment $T_C$ is $N_{TA}$.

4) The gateway station BS detects the PRACH Preamble at the moment $T_E$, where the propagation delay of the moment $T_E$ relative to the moment $T_D$ is $(T_E-T_D)=(T_1+T_2)+T_3$, and the propagation delay of the moment $T_E$ relative to the moment $T_A$ is $(T_E-T_A)=2(T1+T2)-T_{offset}$.

Here, $T_{offset}$ is the cell-level timing advance, and the specific calculation method is as described above and will not be repeated here.

Then the delay of the moment $T_D$ relative to the moment $T_C$ is:

$(T_D-T_C)=-N_{TA}=-(2T_3+T_{offset})$, wherein the negative sign indicates that the PRACH Preamble is sent in advance at the moment $T_D$. The BS detects the PRACH Preamble at the moment $T_E$, and the propagation delay of the moment $T_E$ relative to the moment $T_D$ is: $T_E-T_D=(T1+T2)+T3$.

Based on the relationship among the above moments, the propagation delay of the moment $T_E$ relative to the moment $T_A$ is:

$$(T_E-T_A)=2(T_1+T_2)-T_{offset}$$

After detecting the PRACH Preamble sequence sent by the terminal, the base station sends an RAR message to the terminal, where the RAR message includes the uplink timing advance adjustment and an uplink grant.

Here, the downlink subframe and the uplink subframe of the network-side device maintain the same subframe index value (index).

There is a common offset $B_{TA}$ between the reference uplink subframe index of the network-side device and the uplink subframe index actually received by the network-side device, such as $B_{TA}=2(T1+T2)-T_{offset}$ as shown in the above formula.

After sending the PRACH Preamble sequence, the terminal detects the feedback RAR message within the RAR time window, where the RAR message includes the uplink timing advance adjustment and the uplink grant; and achieves uplink synchronization and sends an RRC message according to the feedback RAR message.

Here, the RAR time window takes the receiving position of the configuration message as the starting point, and the starting point position is determined according to the cell public delay information received by the terminal.

The network-side device receives the RRC message sent after the terminal achieves uplink synchronization; and sends a contention resolution message to the terminal.

The terminal receives and decodes the feedback contention resolution message.

To sum up, the establishment of the random access process between the terminal and the network-side device in the random access system is completed through the foregoing method of the embodiments of the application. In the downlink of the terminal, the received downlink frame index, subframe index and slot index are used as the current subframe index; when the terminal achieves the uplink signal frame synchronization for the first time in the random access process, it is consistent with the public delay of the cell by supplementing the relative transmission delay, that is, the uplink transmission timing position of the shortest public distance of the cell from the satellite is used as the benchmark, and the time for signals from all terminals in the cell to reach the network-side device is based on the cell public distance; and the method provided in the embodiments of the application can ensure that all terminals in a cell covered by satellite beams have the same uplink subframe index.

At the same time, the PRACH Preamble format in the configuration message sent by the network-side device in the embodiment of the application is different from the PRACH Preamble format in the prior art.

Currently, the Rel-15 NR supports the PRACH Preamble formats of two lengths.

The following Table 1 and Table 2 respectively give the CP lengths of the PRACH sequences corresponding to the long PRACH sequence and the short PRACH sequence supported by the 5G NR. It can be seen from Table 4 and Table 5 that the maximum CP length is 0.684 ms.

TABLE 1

PRACH CP length corresponding to long PRACH sequence

| PRACH format | PRACH CP length | | | |
|---|---|---|---|---|
| | 0 | 1 | 2 | 3 |
| T_CP [ms] | 0.103 | 0.684 | 0.153 | 0.103 |
| T_SEQ [ms] | 0.8 | 1.603 | 3.2 | 0.8 |
| T_GT [ms] | 0.097 | 0.713 | 0.147 | 0.097 |

TABLE 2

PRACH CP length corresponding to short PRACH sequence

| PRACH format | PRACH CP length | | | | | | | | |
|---|---|---|---|---|---|---|---|---|---|
| | A1 | A2 | A3 | B1 | B2 | B3 | B4 | C0 | C2 |
| T_CP [us] | 9.375 | 18.75 | 28.125 | 7.031 | 11.719 | 16.406 | 30.469 | 40.36 | 66.67 |
| T_GT [us] | 0 | 0 | 0 | 2.344 | 7.031 | 11.719 | 25.781 | 35.677 | 94.922 |

As shown in FIG. 2, when d1=35786 km and the fixed cell radius $S_{max}/2=200$ km, the values of the maximum relative distance difference d3=d2−d1 and the relative transmission delay T3 are as shown in Table 3.

TABLE 3 relative distance difference d3, relative transmission delay T3 and satellite elevation angle $\alpha_2$

| Satellite elevation angle $\alpha_2$ [degree] | Cell radius ($S_{max}/2$) [km] | d3 [km] | T3 [ms] |
|---|---|---|---|
| 10 | 200 | 390 | 1.300 |
| 20 | 200 | 372 | 1.240 |
| 30 | 200 | 343 | 1.143 |
| 40 | 200 | 303 | 1.010 |
| 50 | 200 | 254 | 0.847 |
| 60 | 200 | 197 | 0.657 |
| 70 | 200 | 134 | 0.447 |
| 80 | 200 | 67 | 0.223 |

If the relative transmission delay T3 shown in Table 1 is less than the size of the CP of the PRACH, the PRACH Preamble format of the 5G NR can be reused. For all cases where T3 is greater than 0.684 ms in the satellite system, a new PRACH format needs to be designed.

However, in the application, there is no need to use the length of the CP and GT to counteract the above delay, and the length of the CP is not required to be greater than twice the cumulative sum of the maximum unidirectional transmission delay and the maximum multipath transmission delay, and also the length of the GT is not required to be greater than twice the maximum unidirectional transmission delay, reducing the length of the CP and reducing the overhead of the PRACH channel.

Specifically, the PRACH Preamble format includes plurality of CPs, a Preamble sequence and GT, where the duration of the plurality of CPs is greater than the sum of a transmission delay introduced by the movement distance of the satellite in the random access process of the terminal, a delay introduced by a GPS positioning error and a delay introduced by a timing estimation error in the downlink initial synchronization process.

The total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

At the same time, the subcarrier interval occupied by the PRACH Preamble sequence is determined according to the Doppler frequency offset range supported by the terminal. For example, the subcarrier interval occupied by the PRACH Preamble sequence is determined according to the Doppler frequency offset range corresponding to the terminal at different moving speeds and/or the sum of the residual frequency offset after the initial synchronization of the terminal and the Doppler frequency offset caused by the satellite movement in the process of sending the configuration message.

The design idea of the PRACH Preamble format in an embodiment of the application is as follows:

the length of the CP and the length of the GT both need to be greater than the sum of three kinds of delays, which are the transmission delay introduced by the movement distance of the satellite in the random access process, the delay introduced by the GPS positioning error, and the delay introduced by the timing estimation error in the downlink initial synchronization process respectively;

the Sub-Carrier Spacing (SCS) is based on a limited set TypeA of the Zadoff-chu sequence, and must be greater than the maximum Doppler frequency offset of the NTN system;

the length of the Preamble sequence depends on the PRACH detection and link budget performance.

The PRACH Preamble format in the embodiments of the application can support the terminal's moving speed equal to or higher than 1000 km/h. For example, the terminal's moving speed can reach 1000 km/h when the terminal user uses it in an airplane.

Taking the moving speed of 1000 km/h as an example, the size of the SCS occupied in the PRACH Preamble format is determined based on the following factors:

1) the terminal at the above speed can get a Doppler frequency deviation of +/−27 khz under the typical carrier frequency;
2) there will be a residual frequency offset of +/1 khz after the terminal obtains the initial signal synchronization in the random access process;
3) the Doppler frequency offset caused by the terminal due to the satellite movement in the process of sending the PRACH Preamble is about 0.4 khz;
4) the Doppler frequency offset range that the sub-carrier spacing can tolerate under the condition of the limited set TypeA of the Zadoff-chu sequence is: [−SCS, +SCS].

Here, the PRACH Preamble sequence is generated by cyclic biasing of the Zadoff-chu sequence. Based on the above factors, the PRACH Preamble sequence used in the embodiment of the application is a Zadoff-chu sequence with a length of 839, which supports the unlimited set and the limited set TypeA. Thus, the PRACH Preamble sequence designed in the embodiments of the application can tolerate the Doppler frequency offset range of [−30, +30], and can tolerate the Doppler frequency offset of +/−27 khz caused by the terminal at a speed of 1000 km/h, the residual frequency offset of +/1 khz caused after the initial signal synchronization is obtained, and the Doppler frequency offset of about 0.4 khz caused by the satellite movement. Therefore, in the embodiment of the application, the sub-carrier interval is 30 khz and occupies 20 Physical Resource Blocks (PRBs), that is, the duration occupied by the sub-carrier interval is T_OFDM=1/30 KHz=33.33 us.

At the same time, the length of the CP occupied in the PRACH Preamble format is determined based on the following factors:
1) the transmission delay introduced by the moving distance of the satellite in the random access process of the terminal;
2) the delay introduced by the GPS positioning error;
3) the delay introduced by the timing estimation error in the downlink initial synchronization process of the terminal;
4) the delay caused by the frequency offset pre-compensation performed on the PRACH Preamble when the PRACH Preamble is sent.

In an implementation of the application, the designed CP=5×T_OFDM=166.7 us, and the CP can tolerate a delay of 20 us caused by the satellite moving distance of up to 6 km in the random access process.

Figure 6:
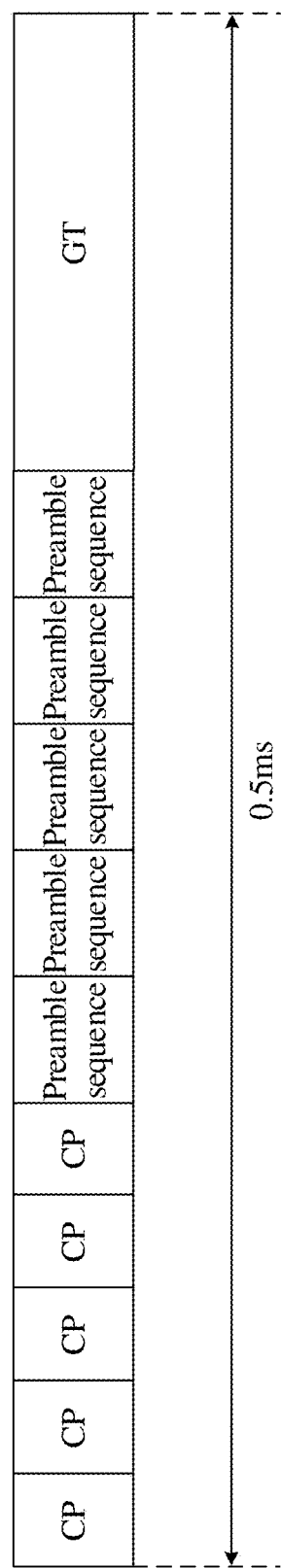
FIG. 6 shows a schematic diagram of a PRACH Preamble format provided by an embodiment of the application.

A specific PRACH Preamble format provided by an embodiment of the application is shown in FIG. 6.

The sub-carrier spacing is 30 khz, CP=5×T_OFDM=166.7 us.

Preamble sequence length=5×T_OFDM=166.7 us.

Guard Time GT=5×T_OFDM=166.7 us.

Total PRACH length=166.7 us+166.7 us+166.7 us=500 us=0.5 ms.

Figure 7:
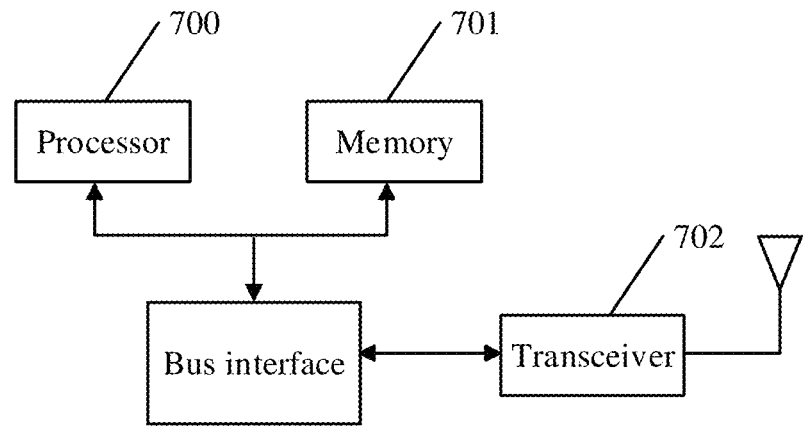
FIG. 7 shows a schematic diagram of a terminal for random access provided by an embodiment of the application.

As shown in FIG. 7, a terminal for random access provided by an embodiment of the application includes: a processor 700, a memory 701 and a transceiver 702.

The processor 700 is responsible for managing the bus architecture and general processing, and the memory 701 may store the data used by the processor 700 when performing the operations. The transceiver 702 is configured to receive and send the data under the control of the processor 700.

The bus architecture may include any numbers of interconnected buses and bridges, and specifically link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by the embodiment of the application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with its hardwares.

Here, the processor 700 is configured to read a program in the memory 701 and perform the process of:
receiving and obtaining a related parameter in a configuration message, wherein the related parameter includes the cell public delay information;
generating a PRACH Preamble sequence, and determining an uplink transmission timing position according to the cell public delay information;
sending the PRACH Preamble sequence on a time-frequency resource corresponding to the uplink transmission timing position.

As an optional embodiment, the processor is specifically configured to:
determine a timing advance of the uplink transmission timing position relative to a configuration message receiving position according to the cell public delay information;
determine the uplink transmission timing position according to the configuration message receiving position and the timing advance.

As an optional embodiment, the processor is specifically configured to:
estimate a relative transmission delay corresponding to a propagation distance difference between a user link propagation path of the terminal and a path of a minimum link delay of a position closest to a satellite;
determine a cell-level timing advance of a deviation between a cell public delay and an integer multiple of a slot according to the cell public delay information;
determine the timing advance according to the relative transmission delay and the cell-level timing advance.

As an optional embodiment, the processor is specifically configured to:
determine the positioning information of the terminal according to a GNSS signal, and obtain the functioning parameter information of the satellite through ephemeris;
estimate the propagation distance difference between the user link propagation path of the terminal and the path of the minimum link delay of the position closest to the satellite according to the positioning information and the functioning parameter information of the satellite;
determine the relative transmission delay corresponding to the estimated propagation distance difference.

As an optional embodiment, the processor is specifically configured to:
find a sum of the relative transmission delay and the cell-level timing advance to obtain the timing advance.

As an optional embodiment, the processor is specifically further configured to:
detect a feedback RAR message within an RAR time window, wherein the RAR message includes an uplink timing advance adjustment and an uplink grant, and the RAR time window starts from the configuration message receiving position;
achieve the uplink synchronization according to the feedback RAR message, and send an RRC message;
receive and decode a feedback contention resolution message.

As an optional embodiment, the configuration message further includes a PRACH Preamble format.

As an optional embodiment, the PRACH Preamble format includes plurality of CPs, a Preamble sequence and GT, wherein the duration of the plurality of CPs is greater than the sum of a transmission delay introduced by a movement distance of a satellite in a random access process of the terminal, a delay introduced by a GPS positioning error and a delay introduced by a timing estimation error in a downlink initial synchronization process;
the total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the subcarrier interval occupied by the PRACH Preamble sequence is determined according to a Doppler frequency offset range corresponding to the terminal at different moving speeds and/or the sum of a residual frequency offset after the initial synchronization of the terminal and a Doppler frequency offset caused by satellite movement in a process of sending the configuration message.

As an optional embodiment, the processor is specifically further configured to:
perform the frequency offset pre-compensation on the generated PRACH Preamble sequence based on an estimated downlink frequency offset.

As an optional embodiment, the processor is specifically configured to:
perform the downlink cell search according to a periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal;
estimate a downlink frequency offset $f_{delta}$ according to a periodic downlink synchronization signal and/or reference signal;
perform the frequency offset pre-compensation on the generated PRACH Preamble sequence according to a formula of:

$$S'_{PRACH}(t) = S_{PRACH}(t) \times \exp(-j \times 2\pi \times f_{delta});$$

wherein $S_{PRACH}(t)$ is a time-domain signal of the PRACH Preamble sequence.

Figure 8:
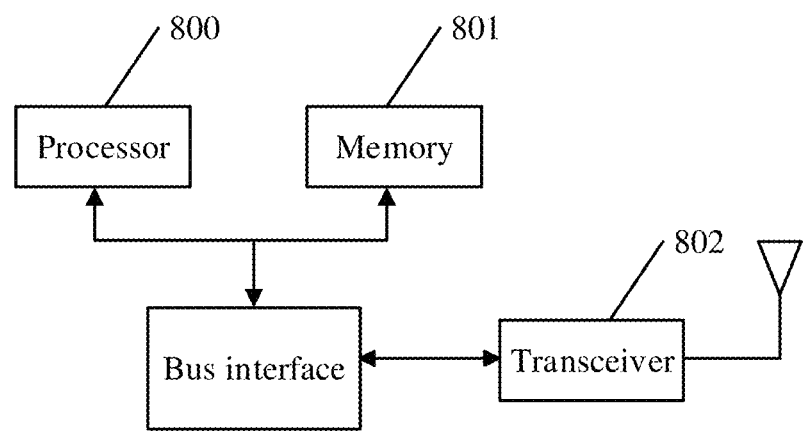
FIG. 8 shows a schematic diagram of a network-side device for random access provided by an embodiment of the application.

As shown in FIG. 8, a network-side device for random access provided by an embodiment of the application includes: a processor 800, a memory 801 and a transceiver 802.

The processor 800 is responsible for managing the bus architecture and general processing, and the memory 801 may store the data used by the processor 800 when performing the operations. The transceiver 802 is configured to receive and send the data under the control of the processor 800.

The bus architecture may include any numbers of interconnected buses and bridges, and specifically link various circuits of one or more processors represented by the processor 800 and the memory represented by the memory 801. The bus architecture may further link various other circuits such as peripheral device, voltage regulator and power management circuit, which are all well known in the art and thus will not be further described again herein. The bus interface provides an interface. The processor 800 is responsible for managing the bus architecture and general processing, and the memory 801 may store the data used by the processor 800 when performing the operations.

The procedure disclosed by the embodiment of the application may be applied in the processor 800 or implemented by the processor 800. In the implementation process, each step of the signal processing flow may be completed by the integrated logic circuit of hardware in the processor 800 or the instruction in the form of software. The processor 800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 801, and the processor 800 reads the information in the memory 801 and completes the steps of the signal processing flow in combination with its hardwares.

Here, the processor 800 is configured to read a program in the memory 801 and perform the process of:
sending a configuration message carrying a related parameter to a terminal, wherein the related parameter includes the cell public delay information;

determining an uplink receiving timing position according to the cell public delay information;
detecting a PRACH Preamble sequence sent by the terminal on all candidate PRACH time-frequency resources according to the uplink receiving timing position.

As an optional embodiment, the network-side device is specifically configured to:
determine an offset of the uplink receiving timing position relative to a configuration message sending position according to the cell public delay information;
determine the uplink receiving timing position according to the offset of the uplink receiving timing position relative to the configuration message sending position as well as the configuration message sending position.

As an optional embodiment, the network-side device is specifically configured to:
determine a cell-level timing advance of a deviation between a cell public delay and an integer multiple of a slot according to the cell public delay information;
determine the offset of the uplink receiving timing position relative to the configuration message sending position according to the cell public delay information and the cell-level timing advance.

As an optional embodiment, the network-side device is specifically configured to:
subtract the cell-level timing advance from the cell public delay to obtain the offset of the uplink receiving timing position relative to the configuration message sending position.

As an optional embodiment, the network-side device is specifically further configured to:
send an RAR message to the terminal after detecting the PRACH Preamble sequence sent by the terminal, wherein the RAR message includes an uplink timing advance adjustment and an uplink grant;
receive an RRC message sent by the terminal after achieving uplink synchronization;
send a contention resolution message to the terminal.

As an optional embodiment, the configuration message further includes a PRACH Preamble format.

As an optional embodiment, the PRACH Preamble format includes plurality of CPs, a Preamble sequence and GT, wherein the duration of the plurality of CPs is greater than the sum of a transmission delay introduced by a movement distance of a satellite in a random access process of the terminal, a delay introduced by a GPS positioning error and a delay introduced by a timing estimation error in a downlink initial synchronization process;
the total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the network-side device is specifically configured to:
determine the subcarrier interval occupied by the PRACH Preamble sequence according to a Doppler frequency offset range corresponding to the terminal at different moving speeds and/or the sum of a residual frequency offset after the initial synchronization of the terminal and a Doppler frequency offset caused by satellite movement in a process of sending the configuration message.

Figure 11:
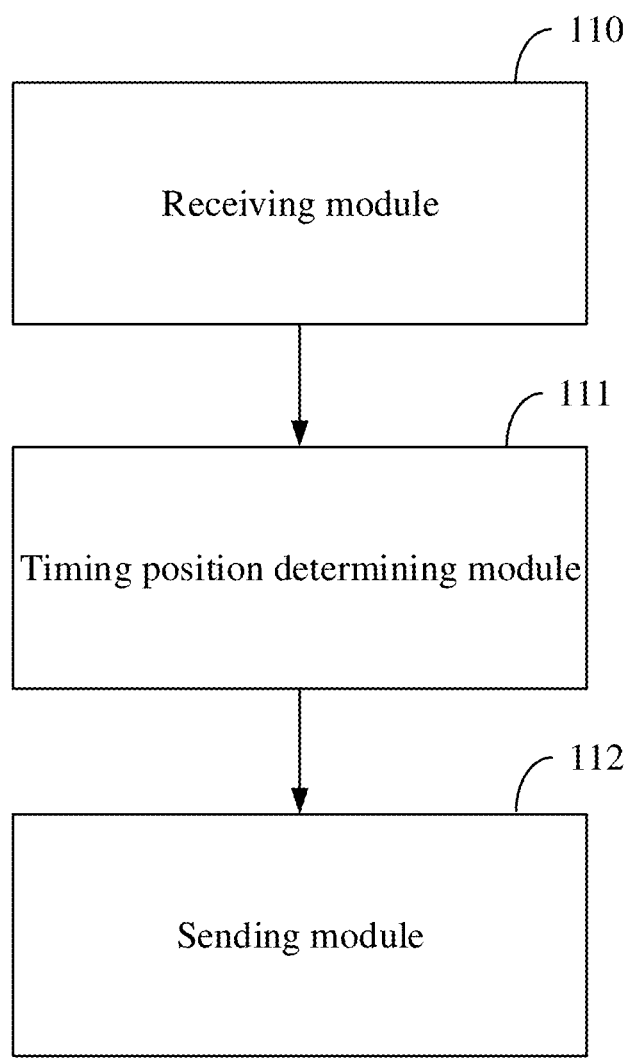
FIG. 11 shows a schematic diagram of another terminal for random access provided by an embodiment of the application.

As shown in FIG. 11, an embodiment of the application further provides another terminal for random access, including:
a receiving module 110 configured to receive and obtain a related parameter in a configuration message, wherein the related parameter includes the cell public delay information;
a timing position determining module 111 configured to generate a PRACH Preamble sequence, and determine an uplink transmission timing position according to the cell public delay information;
a sending module 112 configured to send the PRACH Preamble sequence on the time-frequency resource corresponding to the uplink transmission timing position.

As an optional embodiment, the timing position determining module is specifically configured to:
determine a timing advance of the uplink transmission timing position relative to a configuration message receiving position according to the cell public delay information;
determine the uplink transmission timing position according to the configuration message receiving position and the timing advance.

As an optional embodiment, the timing position determining module is specifically configured to:
estimate a relative transmission delay corresponding to a propagation distance difference between a user link propagation path of the terminal and a path of a minimum link delay of a position closest to a satellite;
determine a cell-level timing advance of a deviation between a cell public delay and an integer multiple of a slot according to the cell public delay information;
determine the timing advance according to the relative transmission delay and the cell-level timing advance.

As an optional embodiment, the timing position determining module is specifically configured to:
determine the positioning information of the terminal according to a GNSS signal, and obtain the functioning parameter information of the satellite through ephemeris;
estimate the propagation distance difference between the user link propagation path of the terminal and the path of the minimum link delay of the position closest to the satellite according to the positioning information and the functioning parameter information of the satellite;
determine the relative transmission delay corresponding to the estimated propagation distance difference.

As an optional embodiment, the timing position determining module is specifically configured to:
find a sum of the relative transmission delay and the cell-level timing advance to obtain the timing advance.

As an optional embodiment, the timing position determining module is specifically further configured to:
detect a feedback RAR message within an RAR time window, wherein the RAR message includes an uplink timing advance adjustment and an uplink grant, and the RAR time window starts from the configuration message receiving position;
achieve uplink synchronization according to the feedback RAR message, and send an RRC message;
receive and decode a feedback contention resolution message.

As an optional embodiment, the configuration message further includes a PRACH Preamble format.

As an optional embodiment, the PRACH Preamble format includes plurality of CPs, a Preamble sequence and GT, wherein the total duration of the plurality of CPs is greater than the sum of a transmission delay introduced by a movement distance of a satellite in a random access process of the terminal, a delay introduced by a GPS positioning error and a delay introduced by a timing estimation error in a downlink initial synchronization process;

the total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the subcarrier interval occupied by the PRACH Preamble sequence is determined according to a Doppler frequency offset range corresponding to the terminal at different moving speeds and/or the sum of a residual frequency offset after the initial synchronization of the terminal and a Doppler frequency offset caused by satellite movement in a process of sending the configuration message.

As an optional embodiment, the timing position determining module is specifically further configured to:

perform the frequency offset pre-compensation on the generated PRACH Preamble sequence based on an estimated downlink frequency offset.

As an optional embodiment, the timing position determining module is specifically configured to:

perform the downlink cell search according to a periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal;

estimate a downlink frequency offset $f_{delta}$ according to a periodic downlink synchronization signal and/or reference signal;

perform the frequency offset pre-compensation on the generated PRACH Preamble sequence according to a formula of:

$$S'_{PRACH}(t)=S_{PRACH}(t)\times\exp(-j\times2\pi\times f_{delta});$$

wherein $S_{PRACH}(t)$ is a time-domain signal of the PRACH Preamble sequence.

Figure 12:
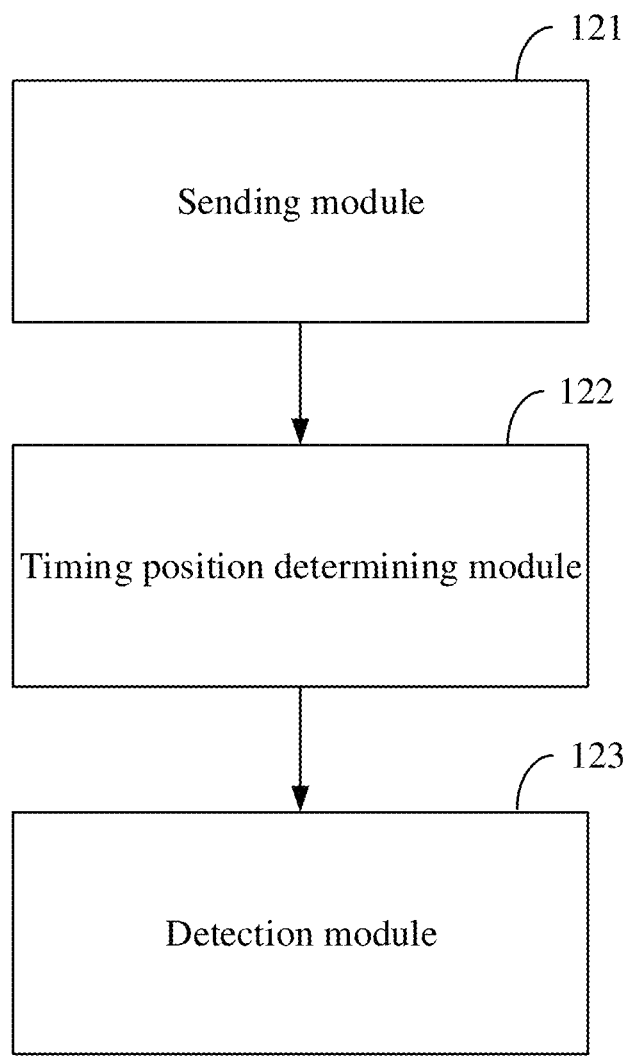
FIG. 12 shows a schematic diagram of another network-side device for random access provided by an embodiment of the application.

As shown in FIG. 12, an embodiment of the application further provides another network-side device for random access, including:

a sending module 121 configured to send a configuration message carrying a related parameter to a terminal, wherein the related parameter includes the cell public delay information;

a timing position determining module 122 configured to determine an uplink receiving timing position according to the cell public delay information;

a detection module 123 configured to detect a PRACH Preamble sequence sent by the terminal on all candidate PRACH time-frequency resources according to the uplink receiving timing position.

As an optional embodiment, the timing position determining module is specifically configured to:

determine an offset of the uplink receiving timing position relative to a configuration message sending position according to the cell public delay information;

determine the uplink receiving timing position according to the offset of the uplink receiving timing position relative to the configuration message sending position as well as the configuration message sending position.

As an optional embodiment, the timing position determining module is specifically configured to:

determine a cell-level timing advance of a deviation between a cell public delay and an integer multiple of a slot according to the cell public delay information;

determine the offset of the uplink receiving timing position relative to the configuration message sending position according to the cell public delay information and the cell-level timing advance.

As an optional embodiment, the timing position determining module is specifically configured to:

subtract the cell-level timing advance from the cell public delay to obtain the offset of the uplink receiving timing position relative to the configuration message sending position.

As an optional embodiment, the network-side device is further configured to:

send an RAR message to the terminal after detecting the PRACH Preamble sequence sent by the terminal, wherein the RAR message includes an uplink timing advance adjustment and an uplink grant;

receive an RRC message sent by the terminal after achieving uplink synchronization;

send a contention resolution message to the terminal.

As an optional embodiment, the configuration message further includes a PRACH Preamble format.

As an optional embodiment, the PRACH Preamble sequence includes plurality of CPs, a Preamble sequence and GT, wherein the duration of the plurality of CPs is greater than the sum of a transmission delay introduced by a movement distance of a satellite in a random access process of the terminal, a delay introduced by a GPS positioning error and a delay introduced by a timing estimation error in a downlink initial synchronization process;

the total duration of the GT is greater than the sum of the transmission delay introduced by the movement distance of the satellite in the random access process of the terminal, the delay introduced by the GPS positioning error and the delay introduced by the timing estimation error in the downlink initial synchronization process.

As an optional embodiment, a subcarrier interval occupied by the PRACH Preamble sequence is determined according to a Doppler frequency offset range supported by the terminal.

As an optional embodiment, the timing position determining module is specifically configured to:

determine the subcarrier interval occupied by the PRACH Preamble sequence according to a Doppler frequency offset range corresponding to the terminal at different moving speeds and/or the sum of a residual frequency offset after the initial synchronization of the terminal and a Doppler frequency offset caused by satellite movement in a process of sending the configuration message.

An embodiment of the application provides a readable storage medium that is a non-volatile readable storage medium and includes program codes. When the program codes run on a computing device, the program codes are configured to cause the computing device to perform the following steps:

receiving and obtaining a related parameter in a configuration message, wherein the related parameter includes the cell public delay information;

generating a PRACH Preamble sequence, and determining an uplink transmission timing position according to the cell public delay information;

sending the PRACH Preamble sequence on a time-frequency resource corresponding to the uplink transmission timing position.

An embodiment of the application provides a readable storage medium that is a non-volatile readable storage medium and includes program codes. When the program codes run on a computing device, the program codes are configured to cause the computing device to perform the following steps:

sending a configuration message carrying a related parameter to a terminal, wherein the related parameter includes the cell public delay information;

determining an uplink receiving timing position according to the cell public delay information;

detecting a PRACH Preamble sequence sent by the terminal on all candidate PRACH time-frequency resources according to the uplink receiving timing position.

Based on the same inventive concept, an embodiment of the application further provides a method for a terminal to perform random access. Since the terminal corresponding to this method is the terminal in the random access system of the embodiments of the application and the principle of this method to solve the problem is similar to that of the terminal, the implementations of this method can refer to the implementations of the system, and the repeated description thereof will be omitted here.

Figure 9:
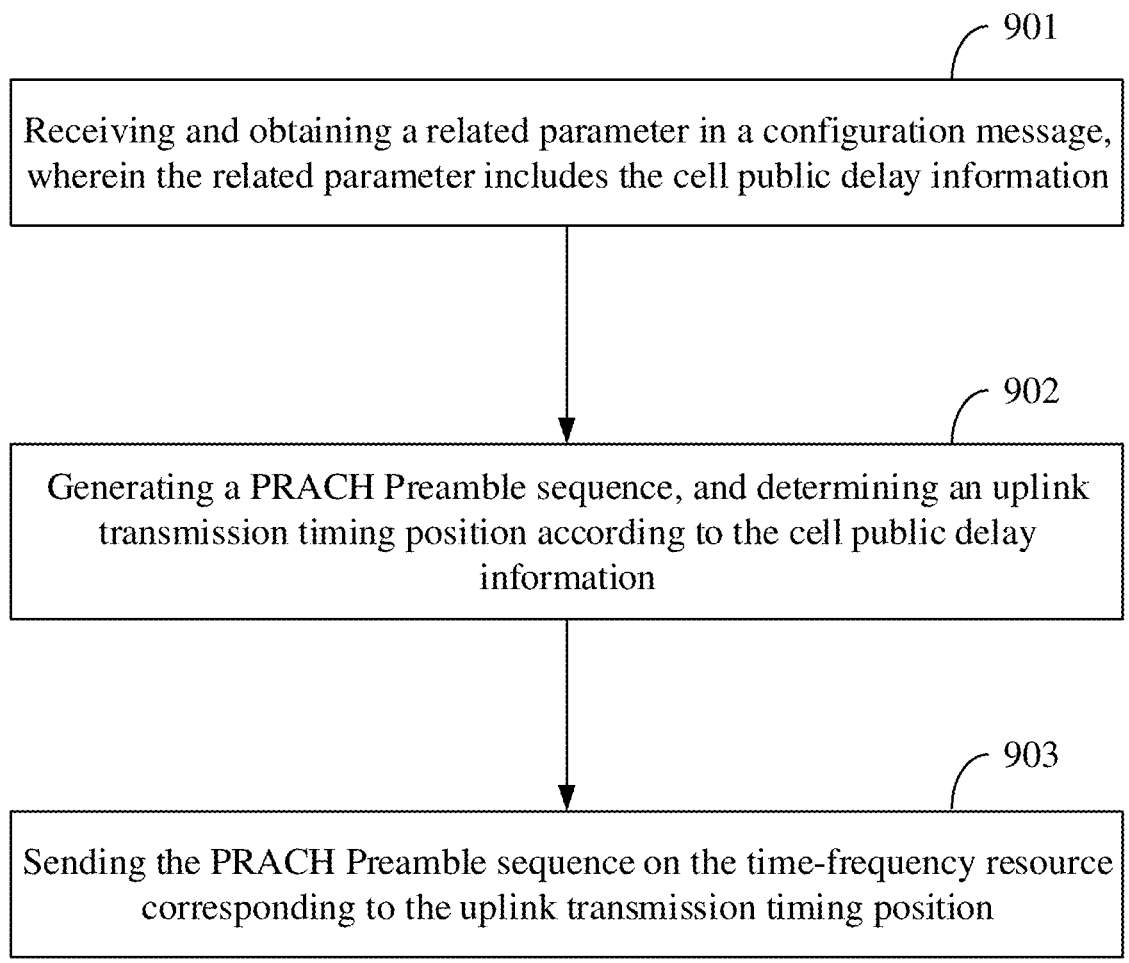
FIG. 9 shows a flowchart of a method for random access of a terminal provided by an embodiment of the application.

As shown in FIG. 9, a method for a terminal to perform random access in an embodiment of the application includes the following steps.

Step 901: receiving and obtaining a related parameter in a configuration message, wherein the related parameter includes the cell public delay information.

Step 902: generating a PRACH Preamble sequence, and determining an uplink transmission timing position according to the cell public delay information.

Step 903: sending the PRACH Preamble sequence on the time-frequency resource corresponding to the uplink transmission timing position.

As an optional embodiment, the step of determining the uplink transmission timing position according to the cell public delay information includes:

determining a timing advance of the uplink transmission timing position relative to a configuration message receiving position according to the cell public delay information;

determining the uplink transmission timing position according to the configuration message receiving position and the timing advance.

As an optional embodiment, the step of determining the timing advance of the uplink transmission timing position relative to the configuration message receiving position according to the cell public delay information includes:

estimating a relative transmission delay corresponding to a propagation distance difference between a user link propagation path of the terminal and a path of a minimum link delay of a position closest to a satellite;

determining a cell-level timing advance of a deviation between a cell public delay and an integer multiple of a slot according to the cell public delay information;

determining the timing advance according to the relative transmission delay and the cell-level timing advance.

As an optional embodiment, the step of estimating the relative transmission delay includes:

determining the positioning information of the terminal according to a GNSS signal, and obtaining the functioning parameter information of the satellite through ephemeris;

estimating the propagation distance difference between the user link propagation path of the terminal and the path of the minimum link delay of the position closest to the satellite according to the positioning information and the functioning parameter information of the satellite;

determining the relative transmission delay corresponding to the estimated propagation distance difference.

As an optional embodiment, the step of determining the timing advance according to the relative transmission delay and the cell-level timing advance includes:

finding a sum of twice the relative transmission delay and the cell-level timing advance to obtain the timing advance.

As an optional embodiment, after sending the PRACH Preamble sequence on the time-frequency resource corresponding to the uplink transmission timing position, the method further includes:

detecting a feedback RAR message within an RAR time window, wherein the RAR message includes an uplink timing advance adjustment and an uplink grant, and the RAR time window starts from the configuration message receiving position;

achieving the uplink synchronization according to the feedback RAR message, and sending an RRC message;

receiving and decoding a feedback contention resolution message.

As an optional embodiment, the configuration message further includes a PRACH Preamble format.

As an optional embodiment, the PRACH Preamble format includes plurality of CPs, a Preamble sequence and GT, wherein the total duration of the plurality of CPs and the length of the GT are greater than the sum of a transmission delay introduced by a movement distance of a satellite in a random access process of the terminal, a delay introduced by a GPS positioning error and a delay introduced by a timing estimation error in a downlink initial synchronization process.

As an optional embodiment, a subcarrier interval occupied by the PRACH Preamble sequence is determined according to a Doppler frequency offset range supported by the terminal.

As an optional embodiment, the subcarrier interval occupied by the PRACH Preamble sequence is determined according to a Doppler frequency offset range corresponding to the terminal at different moving speeds and/or the sum of a residual frequency offset after the initial synchronization of the terminal and a Doppler frequency offset caused by satellite movement in a process of sending the configuration message.

As an optional embodiment, before sending the PRACH Preamble sequence on the time-frequency resource corresponding to the uplink transmission timing position, the method further includes:

performing the frequency offset pre-compensation on the generated PRACH Preamble sequence based on an estimated downlink frequency offset.

As an optional embodiment, the step of performing the frequency offset pre-compensation on the generated PRACH Preamble sequence based on the estimated downlink frequency offset includes:

performing, by the terminal, the downlink cell search according to a periodic position of a frame structure where a downlink synchronization signal and/or reference signal predefined by a protocol is/are located, including downlink timing synchronization position estimation and downlink frequency offset estimation operations, to obtain the downlink synchronization signal and/or reference signal;

estimating a downlink frequency offset f delta according to a periodic downlink synchronization signal and/or reference signal;

performing the frequency offset pre-compensation on the generated PRACH Preamble sequence according to a formula of:

$$S'_{PRACH}(t)=S_{PRACH}(t)\times\exp(-j\times 2\pi\times f_{delta});$$

wherein $S_{PRACH}(t)$ is a time-domain signal of the PRACH Preamble sequence.

Based on the same inventive concept, an embodiment of the application further provides a method for a network-side device to perform random access. Since the network-side device corresponding to this method is the network-side device in the random access system of the embodiments of the application and the principle of this method to solve the problem is similar to that of the device, the implementations of this method can refer to the implementations of the system, and the repeated description thereof will be omitted here.

Figure 10:
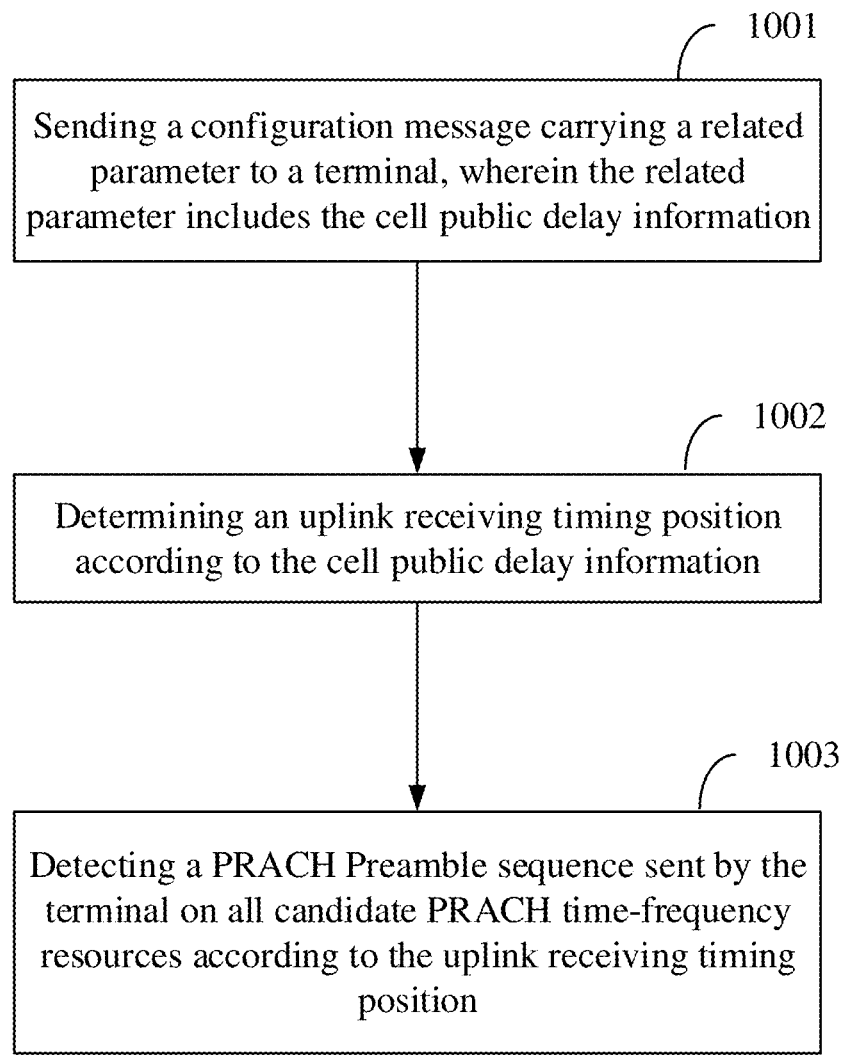
FIG. 10 shows a flowchart of a method for random access of a network-side device provided by an embodiment of the application.

As shown in FIG. 10, an embodiment of the application provides a method for a network-side device to perform random access, which includes the following steps.

Step 1001: sending a configuration message carrying a related parameter to a terminal, wherein the related parameter includes the cell public delay information.

Step 1002: determining an uplink receiving timing position according to the cell public delay information.

Step 1003: detecting a PRACH Preamble sequence sent by the terminal on all candidate PRACH time-frequency resources according to the uplink receiving timing position.

As an optional embodiment, the step of determining the uplink receiving timing position according to the cell public delay information includes:

determining an offset of the uplink receiving timing position relative to a configuration message sending position according to the cell public delay information;

determining the uplink receiving timing position according to the offset of the uplink receiving timing position relative to the configuration message sending position as well as the configuration message sending position.

As an optional embodiment, the step of determining the offset of the uplink receiving timing position relative to the configuration message sending position according to the cell public delay information includes:

determining a cell-level timing advance of a deviation between a cell public delay and an integer multiple of a slot according to the cell public delay information;

determining the offset of the uplink receiving timing position relative to the configuration message sending position according to the cell public delay information and the cell-level timing advance.

As an optional embodiment, the step of determining the offset of the uplink receiving timing position relative to the configuration message sending position according to the cell public delay information and the cell-level timing advance includes:

subtracting the cell-level timing advance from the cell public delay to obtain the offset of the uplink receiving timing position relative to the configuration message sending position.

As an optional embodiment, the method further includes:

sending an RAR message to the terminal after detecting the PRACH Preamble sequence sent by the terminal, wherein the RAR message includes an uplink timing advance adjustment and an uplink grant;

receiving an RRC message sent by the terminal after achieving uplink synchronization;

sending a contention resolution message to the terminal.

As an optional embodiment, the configuration message further includes a PRACH Preamble format.

As an optional embodiment, the PRACH Preamble format includes plurality of CPs, a Preamble sequence and GT, wherein the duration of the plurality of CPs and the duration of the GT are greater than the sum of a transmission delay introduced by a movement distance of a satellite in a random access process of the terminal, a delay introduced by a GPS positioning error and a delay introduced by a timing estimation error in a downlink initial synchronization process.

As an optional embodiment, a subcarrier interval occupied by the PRACH Preamble sequence is determined according to a Doppler frequency offset range supported by the terminal.

As an optional embodiment, the step of determining the subcarrier interval occupied by the PRACH Preamble sequence according to the Doppler frequency offset range supported by the terminal includes:

determining the subcarrier interval occupied by the PRACH Preamble sequence according to a Doppler frequency offset range corresponding to the terminal at different moving speeds and/or the sum of a residual frequency offset after the initial synchronization of the terminal and a Doppler frequency offset caused by satellite movement in a process of sending the configuration message.

The application has been described above by reference to the block diagrams and/or flow charts showing the methods, devices (systems) and/or computer program products according to the embodiments of the application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the application can also be implemented by the hardware and/or software (including the firmware, resident software, microcode and the like). Further, the application can adopt the form of computer program products on the computer usable or computer readable storage medium, which has the computer usable or computer readable program codes implemented in the medium, to be used by the instruction execution system or used in combination with the instruction execution system. In the context of the application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the application without departing from the spirit and scope of the application. Thus the application is also intended to encompass these modifications and variations therein as long as these modifications and variations to the application come into the scope of the claims of the application and their equivalents.

What is claimed is:

1. A method for a terminal to perform random access, comprising: receiving and obtaining a related parameter in a configuration message, wherein the related parameter comprises cell public delay information, wherein the cell public delay information is public transmission delay information of a beam area covered by a Non-Terrestrial Networks system, wherein the configuration message comprises a PRACH Preamble format;
generating a Physical Random Access CHannel random access Preamble, PRACH Preamble, sequence, and determining an uplink transmission timing position according to the cell public delay information;
sending the PRACH Preamble sequence on a time-frequency resource corresponding to the uplink transmission timing position;
detecting a feedback Random Access Response, RAR, message within an RAR time window, wherein the RAR message comprises an uplink timing advance adjustment and an uplink grant, and the RAR time window starts from the configuration message receiving position:
achieving uplink synchronization according to the feedback RAR message, and sending a Radio Resource Control, RRC, message; and receiving and decoding a feedback contention resolution message.

2. The method according to claim 1, wherein the PRACH Preamble format comprises a plurality of Cyclic Prefixes, CPs, a Preamble sequence and Guard Time, GT, wherein a total duration of the plurality of CPs is greater than a sum of a transmission delay introduced by a movement distance of a satellite during a random access process of the terminal, a delay introduced by a GPS positioning error and a delay introduced by a timing estimation error in a downlink initial synchronization process; a total duration of the GT is greater than the sum of the transmission delay introduced by the movement distance of the satellite during the random access process of the terminal, the delay introduced by the GPS positioning error and the delay introduced by the timing estimation error in the downlink initial synchronization process.

3. The method according to claim 2, wherein a subcarrier interval occupied by the PRACH Preamble sequence is determined according to a Doppler frequency offset range supported by the terminal; wherein the subcarrier interval occupied by the PRACH Preamble sequence is determined according to a Doppler frequency offset range corresponding to the terminal at different moving speeds and/or a sum of a residual frequency offset after the initial synchronization of the terminal and a Doppler frequency offset caused by satellite movement in a process of sending the configuration message.

4. The method according to claim 1, wherein before sending the PRACH Preamble sequence on the time-frequency resource corresponding to the uplink transmission timing position, the method further comprises: performing frequency offset pre-compensation on the generated PRACH Preamble sequence based on an estimated downlink frequency offset.

5. The method according to claim 4, wherein the performing frequency offset pre-compensation on the generated PRACH Preamble sequence based on an estimated downlink frequency offset, comprises: estimating a downlink frequency offset f_delta according to a periodic downlink synchronization signal and/or reference signal; performing the frequency offset pre-compensation on the generated PRACH Preamble sequence according to a formula of: S'PRACH(t)SPRACH(t)Xexp(−jX2X f_delta);wherein SPRACH(t) is a time-domain signal of the PRACH Preamble sequence.

6. A computer storage medium storing a computer program thereon, wherein the program, when executed by a processor, implements steps of the method of claim 1.

7. The method according to claim 1, wherein the determining an uplink transmission timing position according to the cell public delay information, comprises: determining a timing advance of the uplink transmission timing position relative to a configuration message receiving position according to the cell public delay information; determining the uplink transmission timing position according to the configuration message receiving position and the timing advance.

8. The method according to claim 7, wherein the determining a timing advance of the uplink transmission timing position relative to a configuration message receiving position according to the cell public delay information, comprises: estimating a relative transmission delay corresponding to a propagation distance difference between a user link propagation path of the terminal and a path of a minimum link delay of a position closest to a satellite; determining a cell-level timing advance of a deviation between a cell public delay and an integer multiple of a slot according to the cell public delay information; determining the timing advance according to the relative transmission delay and the cell-level timing advance.

9. The method according to claim 8, wherein the estimating a relative transmission delay corresponding to a propagation distance difference between a user link propagation path of the terminal and a path of a minimum link delay of a position closest to a satellite, comprises: determining positioning information of the terminal according to a Global Navigation Satellite System, GNSS, signal, and obtaining functioning parameter information of the satellite through ephemeris; estimating the propagation distance difference between the user link propagation path of the terminal and the path of the minimum link delay of the position closest to the satellite according to the positioning information and the functioning parameter information of the satellite; determining the relative transmission delay corresponding to the estimated propagation distance difference.

10. The method according to claim 8, wherein the determining the timing advance according to the relative transmission delay and the cell-level timing advance, comprises: finding a sum of twice the relative transmission delay and the cell-level timing advance to obtain the timing advance.

11. A method for a network-side device to perform random access, comprising: sending a configuration message carrying a related parameter to a terminal, wherein the related parameter comprises cell public delay information, wherein the cell public delay information is public transmission delay information of a beam area covered by a Non-Terrestrial Networks system, wherein the configuration message comprises a PRACH Preamble format; determining an uplink receiving timing position according to the cell public delay information; detecting a PRACH Preamble sequence sent by the terminal on all candidate Physical Random Access CHannel, PRACH, time-frequency resources according to the uplink receiving timing position; sending a Random Access Response, RAR, message to the terminal in response to detecting the PRACH Preamble sequence sent by the terminal, wherein the RAR message comprises an uplink timing advance adjustment and an uplink grant; receiving a Radio Resource Control, RRC, message sent by the terminal after achieving uplink synchronization; and sending a contention resolution message to the terminal.

12. The method according to claim 11, wherein the PRACH Preamble format comprises a plurality of Cyclic Prefixes, CPs, a Preamble sequence and Guard Time, GT, wherein a duration of the plurality of CPs is greater than a sum of a transmission delay introduced by a movement distance of a satellite during a random access process of the terminal, a delay introduced by a GPS positioning error and a delay introduced by a timing estimation error in a downlink initial synchronization process; a total duration of the GT is greater than the sum of the transmission delay introduced by the movement distance of the satellite during the random access process of the terminal, the delay introduced by the GPS positioning error and the delay introduced by the timing estimation error in the downlink initial synchronization process.

13. The method according to claim 12, wherein a subcarrier interval occupied by the PRACH Preamble sequence is determined according to a Doppler frequency offset range supported by the terminal; wherein the determining the subcarrier interval occupied by the PRACH Preamble sequence according to the Doppler frequency offset range supported by the terminal, comprises: determining the subcarrier interval occupied by the PRACH Preamble sequence according to a Doppler frequency offset range corresponding to the terminal at different moving speeds and/or a sum of a residual frequency offset after the initial synchronization of the terminal and a Doppler frequency offset caused by satellite movement in a process of sending the configuration message.

14. A network-side device for random access, wherein the network-side device comprises a processor and a memory, wherein the processor is configured to read a program in the memory and execute a process of the method according to claim 11.

15. The method according to claim 11, wherein the determining an uplink receiving timing position according to the cell public delay information, comprises: determining an offset of the uplink receiving timing position relative to a configuration message sending position according to the cell public delay information; determining the uplink receiving timing position according to the offset of the uplink receiving timing position relative to the configuration message sending position as well as the configuration message sending position.

16. The method according to claim 15, wherein the determining an offset of the uplink receiving timing position relative to a configuration message sending position according to the cell public delay information, comprises: determining a cell-level timing advance of a deviation between a cell public delay and an integer multiple of a slot according to the cell public delay information; determining the offset of the uplink receiving timing position relative to the configuration message sending position according to the cell public delay information and the cell-level timing advance.

17. The method according to claim 16, wherein the determining the offset according to the cell public delay information and the cell-level timing advance, comprises: subtracting the cell-level timing advance from the cell public delay to obtain the offset of the uplink receiving timing position relative to the configuration message sending position.

18. A terminal for random access, wherein the terminal comprises a processor and a memory, wherein the processor is configured to read a program in the memory and execute a process of:
receiving and obtaining a related parameter in a configuration message, wherein the related parameter comprises cell public delay information, wherein the cell public delay information is public transmission delay information of a beam area covered by a Non-Terrestrial Networks system, wherein the configuration message comprises a PRACH Preamble format;
generating a Physical Random Access CHannel random access Preamble, PRACH Preamble, sequence, and determining an uplink transmission timing position according to the cell public delay information;
sending the PRACH Preamble sequence on a time-frequency resource corresponding to the uplink transmission timing position;
detecting a feedback Random Access Response, RAR, message within an RAR time window, wherein the RAR message comprises an uplink timing advance adjustment and an uplink grant, and the RAR time window starts from the configuration message receiving position;
achieving uplink synchronization according to the feedback RAR message, and sending a Radio Resource Control, RRC, message; and receiving and decoding a feedback contention resolution message.

* * * * *